April 10, 1945.                A. B. CARLILE                2,373,164
                         EDUCATIONAL TEST MACHINE
                           Filed May 27, 1944          3 Sheets-Sheet 1

INVENTOR.
Amos B. Carlile,
By Herbert A. Minturn,
Attorney.

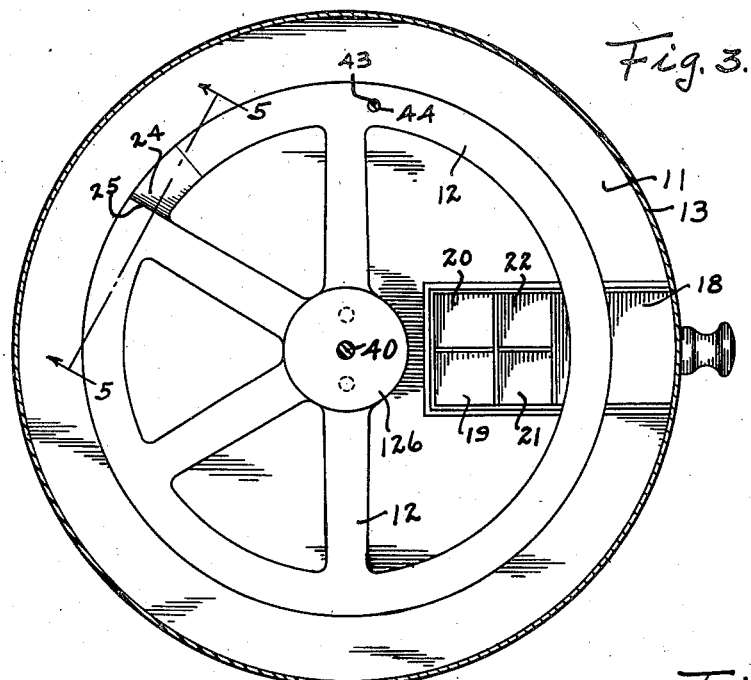
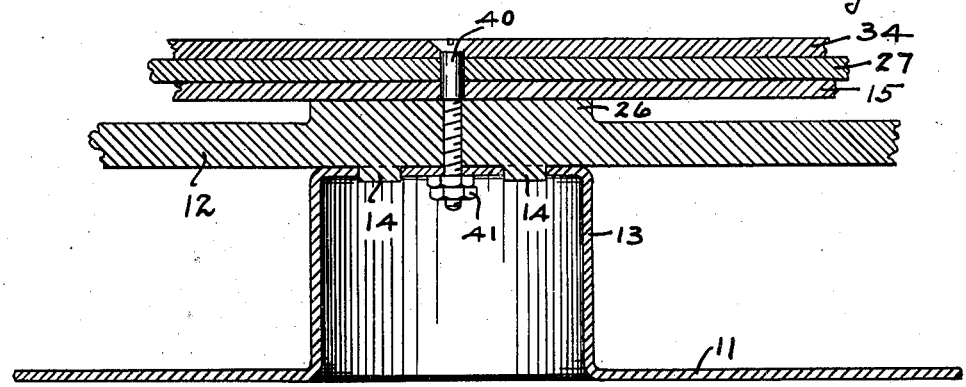
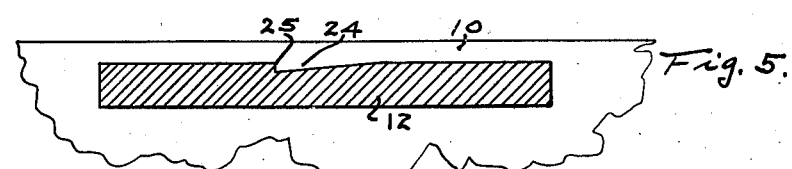
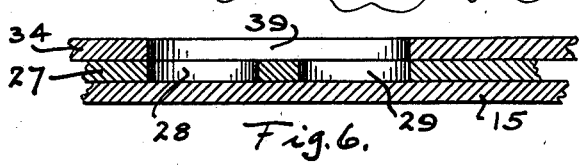

April 10, 1945.  A. B. CARLILE  2,373,164
EDUCATIONAL TEST MACHINE
Filed May 27, 1944   3 Sheets-Sheet 3.

INVENTOR.
Amos B. Carlile,
By Herbert A. Minturn,
Attorney.

Patented Apr. 10, 1945

2,373,164

UNITED STATES PATENT OFFICE 2,373,164

EDUCATIONAL TEST MACHINE

Amos B. Carlile, Indianapolis, Ind.

Application May 27, 1944, Serial No. 537,558

11 Claims. (Cl. 35—48)

This invention relates to a machine for educational testing purposes.

Advantages of the invention are that the machine separates correct from incorrect responses to test items immediately; it will fit any true-false or multiple choice test that follows the pattern of the separating plate; no writing is required to take tests; special pencils or special answer sheets are not required; the same test booklet may be used again and again; computation of the final score is merely a matter of inspection or pouring disks into a graduated transparent tube; and it is diagnostic, in that it shows what answer was made when a test item is answered incorrectly, thus acting as an aid to a teacher who wishes to know where to place emphasis in his teaching.

Figure 1:
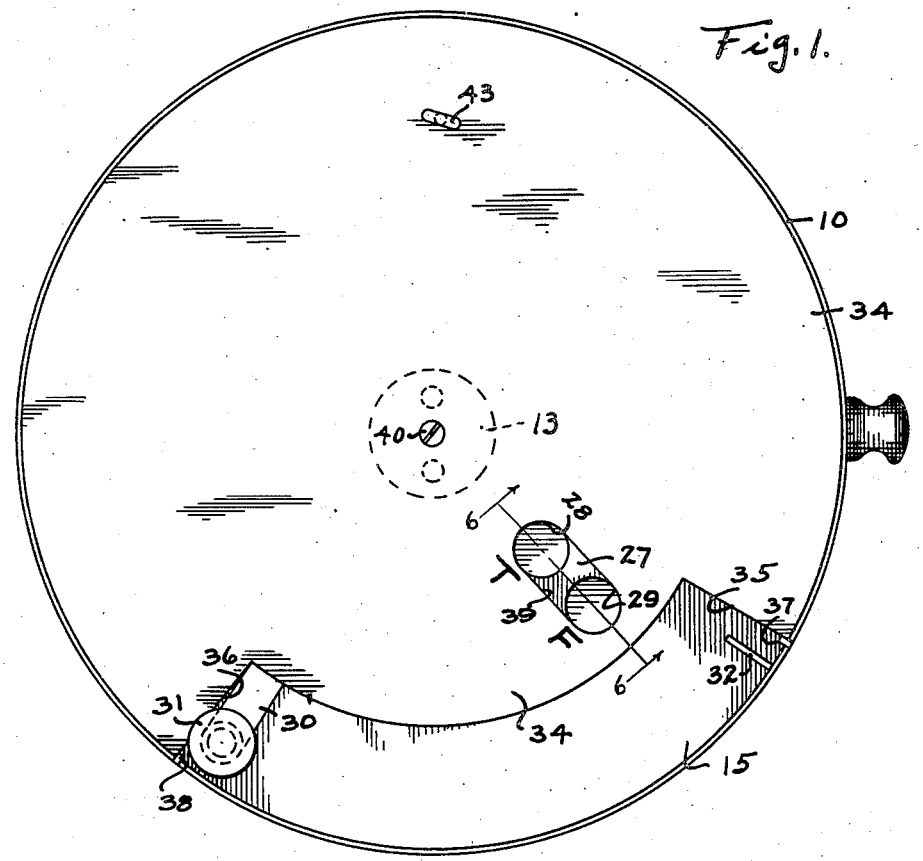
Figure 2:
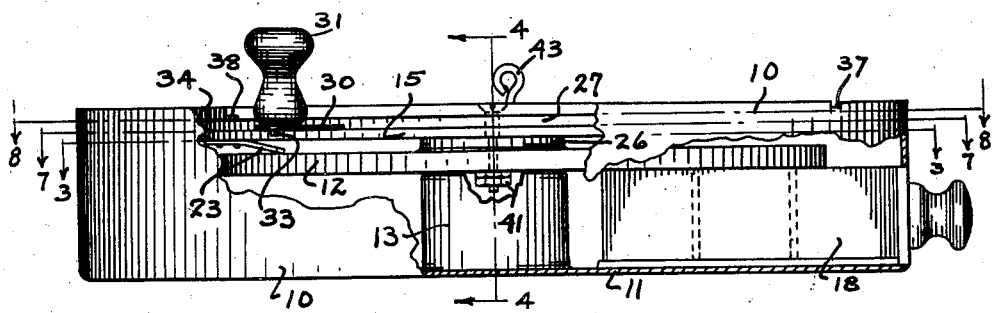
Figure 8:
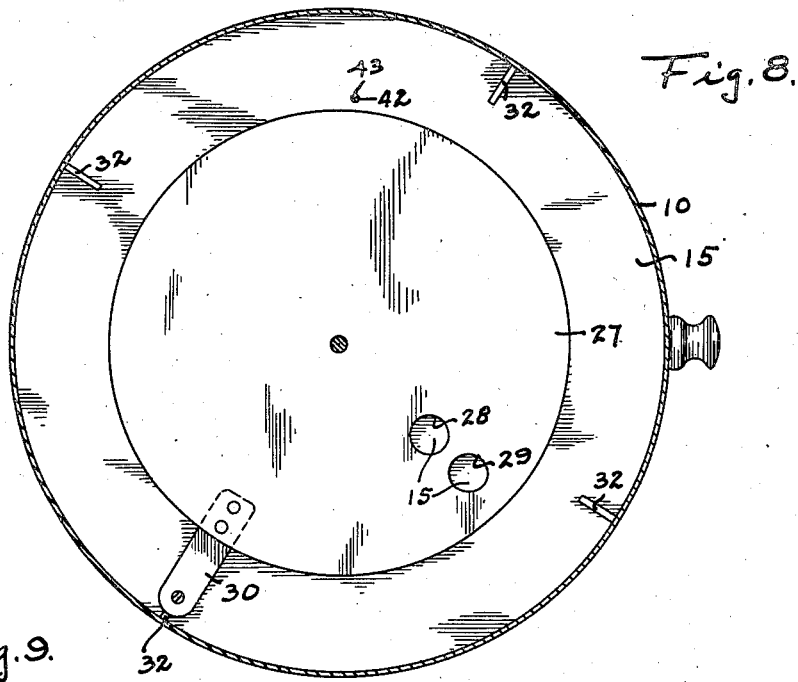
Figures 7, 9:
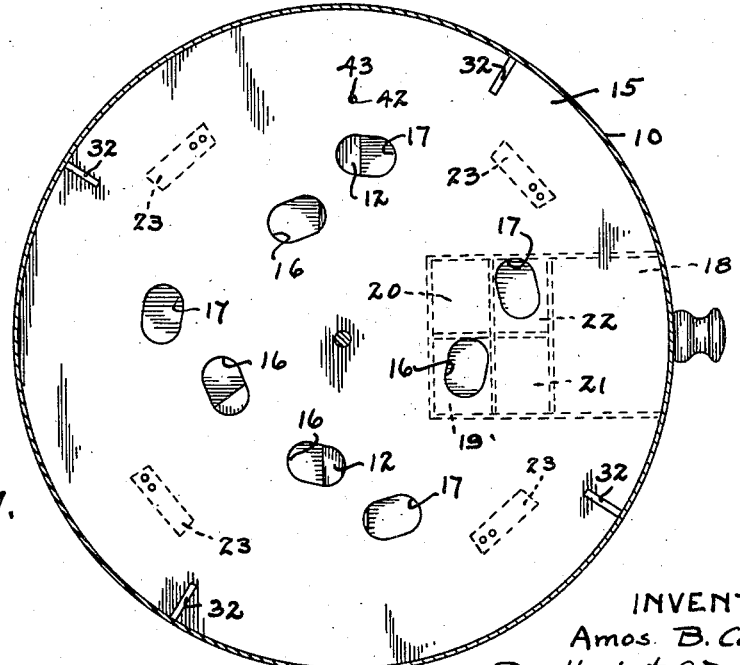

These and many other objects and advantages of the invention will become apparent to those versed in the art from the following description of one particular form of the invention as illustrated in the accompanying drawings, in which Fig. 1 is a top plan view of a structure embodying the invention;

Fig. 2, a view in side elevation and partial section of the structure;

Fig. 3, a view in transverse horizontal section on the line 3—3 in Fig. 2;

Fig. 4, a detail on enlarged scale in vertical transverse section on the line 4—4 in Fig. 2;

Fig. 5, a detail in vertical section on enlarged scale on the line 5—5 in Fig. 3;

Fig. 6, a detail in vertical section on the line 6—6 in Fig. 1;

Fig. 7, a view in horizontal section on the line 7—7 in Fig. 2;

Fig. 8, a view in horizontal section on the line 8—8 of Fig. 2; and

Fig. 9, a view in perspective of the answering disks.

Like characters indicate like parts throughout the several views in the drawings.

A base 10 is formed to be generally cylindrical in form to have a closed floor 11 thereacross and open from its top side. A plate supporting member 12, herein shown as a spider, is mounted within the base 10 spaced above the floor 11 in any suitable manner. One form of mounting is that of a center perpendicular pedestal 13 extending upwardly from the floor 11 to have the spider 12 rest thereon and be secured in some manner against rotation therearound. In the present form, the spider 12 is provided with bosses 14, herein shown as two in number, to register with holes in the top end of the pedestal 13.

Positioned on the top side of the spider 12 is a selector plate 15 provided with a series of holes 16 therethrough centered on a common circumferential line, four such holes 16 being shown in the present form of the invention. Preferably these holes 16 are somewhat elongated circumferentially and are provided with circular end margins. The plate 15 is further provided with a second series of holes 17 centered on another circumferential line, the diameter of which exceeds that of the circle on which the holes 16 are centered. The holes 17 are counter parts of the holes 16, and are staggered in relation thereto, the purpose for which will herein after become more apparent. The plate 15 has a diameter which will just permit the plate to fit within the cylindrical vertical wall of the base 10 and allow the plate to revolve therearound freely without any appreciable opening between the base wall and the margin of the plate.

Entering through a window in the side wall of the base 10 is a drawer 18. The drawer rests upon the floor 11 and is open from its top side to slide under the spider 12 and, therefore, be under the plate 15. The drawer 18 is provided with four individual compartments 19, 20, and 21, 22. When the drawer 18 is in its fully inserted position within the base 10, compartments 19 and 20 will be so located that the holes 16 in the plate 15 may travel thereover as the plate 15 may be rotated about its central axis. The drawer compartments 21 and 22 will also be located to be under the path of the holes 17 of the plate 15.

The plate 15 is provided with a ratchet mechanism to permit the plate 15 to be rotated about its axis in a clockwise direction in respect to Fig. 7, but will prevent rotation thereof in the reverse direction. In the present form of the invention this ratchet mechanism consists of a plurality of equally spaced apart spring tongues 23, herein shown as four in number each having a free end pressed against the top face of the spider 12. At one part of the spider 12 there is formed a depression 24, Fig. 5, formed by a shoulder 25 from which the top surface of the spider 12 slopes upwardly into its horizontal plate so that as the tongues 23 revolve around past the shoulder 25, their free ends will drop down into the depression and counter-clockwise direction of travel is prevented by means of the tongue ends abutting the vertical face of the shoulder 25. To permit clearance between the plate 15 and the top side of the spider 12, these spring members 23 and plate 15 in the present form of the invention are spaced upwardly on the spider 12 by means of a central boss 26, Figs. 2 and 4.

On top of the plate 15 is centrally positioned a circular plate 27, this plate 27 having a diameter less than that of the plate 15 to leave an annular space therearound between its periphery and the vertical wall of the base 10. The plate 27 is provided with a pair of holes 28 and 29 therethrough located on a common radial line toward the outer margin of the plate. Some means for rotating the plate 27 on its vertical axis is provided. In the present form of the invention such means consist of a leaf spring arm 30 secured to the underside thereof and extending radially out over the top side of the plate 15 to terminate within the vertical wall of the base 10, and a knob 31, secured thereto to extend vertically upwardly therefrom. The plate 15 is provided with a series of notches or slots 32 around its marginal portion, four such notches 32 being herein shown, one for each pair of holes 16 and 17 provided in the plate 15. The underside of the arm 30 is provided with a downwardly extending foot 33 shaped to fit within any one of the notches 32 whereby the plate 27 may be rotated counter-clockwise to bring the foot 33 to drop into a notch 32, whereupon the knob 31 may then be pulled around clockwise to carry the plate 15 around in that direction along with the travel of the plate 27.

A top cover plate 34 is placed over the plate 27 and has a diameter such that its marginal edge will just fit within the top end of the vertical wall of the base 10. A part of the marginal portion of this top plate 34 is cut away for about 90 degrees to leave vertical radial edges 35 and 36, the inner ends of which are connected by a line that coincides with the marginal edge of the plate 27 thereunder. The top cover plate 34 is secured in position against rotation about its axis by any suitable means, herein shown as by fingers 37 and 38 bent inwardly from the top edge of the wall of the base 10 to abut the edges 35 and 36, Figs. 1 and 2. The top cover plate 34 is provided with an opening 39 which may register with the holes 28 and 29 in the plate 27 and so located that that register will be obtained when the plate 27 is shifted to have the arm 30 moved around in its limit of clockwise rotation as is determined by the knob 31 striking the edge 36. To provide a central pivot member about which the plates 15 and 27 will be rotated, a screw 40 is passed axially and vertically down through the plates 34, 27 and 15, to abut the spider 12 and pass on therethrough to extend through the top end of the pedestal 13 and be secured in any suitable manner, such as by the nuts 41, Fig. 4. The screw 40 is provided with a suitable head to prevent vertical displacement of the cover plate 34 in relation to the base 10. The shiftable plate 15 is provided with a hole 42 therethrough through which a pin 43 may be inserted by passing the pin down through a hole provided in the cover plate 34 to extend on through the plate 15 outside of the marginal path of the plate 27, Fig. 8, and entering a hole 44 in the spider 12. This hole 42 in the plate 15 is so located in reference to the series of holes 16 and 17 that the plate 15, when the pin 43 is positioned as indicated, will be in its initial starting position for answering question number one of the test. In other words, the plate 15 is always brought to this initial starting position as determined by passing the pin 43 through the plate and into the spider 12 upon the beginning of each test.

The following statements will be submitted in the case of a true or false test:

1. James Madison was the fourth president of the United States.
2. Thomas Jefferson was older than George Washington.
3. Ice cream was first introduced into the United States by Martha Custis.
4. George Washington was the second husband of Martha Custis.
5. George Washington had a violent temper.
6. Webster's Dictionary was made by Daniel Webster.
7. Alexander Hamilton was born in the United States.
8. People of low intelligence reach the peak of their mental development at an earlier age than people of high intelligence.
9. People of high intelligence develop, mentally, faster than people of low intelligence.
10. In general people like to do what they can do least successfully.

Some of such statements are true, some are false. To operate the machine, the pin 43 is withdrawn and laid aside. The disk bearing the number one corresponding to question one will be inserted through the opening 39 and placed in either one of the holes 28 or 39 in the plate 27, depending upon whether or not the statement is considered to be true or false. Hole 28 will be labelled as that hole wherein the disks are to be placed for answers if the contestant considers the statement to be true, and hole 29 is to be used to receive the disk if the contestant considers the statement to be false. The character "T" is indicated on the cover plate 34 at that end of the opening 39 under which the hole 28 appears, and the character "F" is placed toward the other end of the hole 39 under which the hole 29 appears, "T" indicating "true," and "F" indicating "false."

Now assuming that the contestant places disk 1 in the true hole 28, the knob 31 will then be lifted to disengage the foot 33 from the notch 32 in the plate 15 and pulled around counter-clockwise to drop the foot 33 into the notch 32 appearing adjacent the edge 35, Fig. 1. During this travel, the plate 27 will have been rotated to bring the hole 28 into registry with the hole 16, and therefore, the disk 1 will drop through the hole 16 into the drawer compartment 19, the hole 16 in the plate 15 having been located in that position in relation to the proper answer to question 1 whereby the disk 1 will drop into that compartment 19 which will contain all disks for "T" answers wherein the statement is actually true. In other words compartment 19 will hold disks wherein the responses to the statements as being true is the correct answer. On the other hand should the disk 1 have been placed in the "F" hole 29, and the knob 31 pulled around counter-clockwise, to the right, disk 1 would then drop through hole 17 which has been positioned in the disk 15 to be over compartment 22, this compartment 22 being made available to receive the disks for wrong answers in respect to the "F" hole 29. It is to be understood that if the plate 27 is rotated, the disks inserted through the holes 28 and 29 will be carried along in those holes in sliding contact with the top side of the plate 15 until the disks are brought over either the next appearing hole 16 or 17.

As soon as the contestant has heard the disk drop into the drawer 18 he will pull the knob 31 around clockwise with the foot 33 in engagement with the notch 32 and the plate 15 until the knob strikes the edge 36 whereby the plate 15 will have then rotated substantially 90 degrees clockwise to position another pair of holes 16 and 17 over the drawer 18. This next pair of holes 16 and 17 as indicated in Fig. 7 is reversed in relation one to the other in respect to circumferential spacing, that is, the hole 16 in the second pair will be brought over the compartment 20 whereas the hole 17 will be brought over the compartment 21.

Then to answer the second statement, the contestant will select disk 2 and assuming that he considers the statement to be true (a false conclusion) the disk 2 will be placed in hole 28 and the knob 31 lifted to disengage its foot 33 from the plate 15 and the knob will be carried around counter-clockwise while the plate 15 remains stationary, the hole 28 then coming into registry with the hole 16 over the compartment 20 to drop the disk 2 therein, this being a compartment for wrong answers. Then the contestant shifts disk 15 another 90 degrees as above indicated and is ready to answer question number three. Assuming that the contestant will consider this statement to be false, he places disk 3 in hole 29; turns the plate 27 to bring hole 29 into registry with a hole 17 then appearing over compartment 21, which compartment is the one to receive disks when the statements are correctly answered. The same procedure is followed in answering all of the other statements. The correctness of the statements is correlated with the positioning of the holes 16 and 17 circumferentially around the plate 15. In other words for a plate 15 having holes 16 and 17 arranged as indicated in Fig. 7, statement number one will be true; statement number two false; statement number three false; statement number four true; statement number five true; statement number six false; statement number seven false; statement number eight true; statement number nine true; and statement number ten false. For a different arrangement of true-false answers as the correct answers, another plate 15 would have to be substituted with a different arrangement of holes 16 and 17 positioned accordingly. For that reason, given the one plate 15, another set of questions can be prepared to utilize that plate so long as the correct answers are in the sequence indicated.

Obviously the above invention has been described for a "two response" test. Where more responses to any given statement are desired, the holes 28 and 29 may be multiplied along the same radial line, although hardly ever are more than five required. Accordingly the plate 15 would have five holes therethrough, and the compartments in the drawer 18 would likewise be multiplied to be presented under the multiple number of holes.

To check on the answers, the drawer 18 may be withdrawn from the base 10 and the location of the various disks noted in the several compartments. The correctness of the test is thus immediately visualized, or the disks may be poured out from each compartment into separate transparent graduated tubes from which the score of each compartment may be read directly according to the height of the disks within the tubes. By providing the various compartments with the numbered disks, incorrect or correct answers may at once be determined in respect to any one statement so that the contestant may be advised wherein he failed to give the correct answer.

While I have herein shown and described my invention in one particular form in more or less minute detail, it is obvious that many structural changes may be employed without departing from the spirit of the invention, and I, therefore, do not desire to be limited to that precise form beyond the limitations as may be imposed by the following claims.

I claim:

1. A test machine comprising a base; a plate having a plurality of sets of holes therethrough and aligned therearound on circles of different radii which extend from the center of the plate, each set of holes having one hole on one circle and another hole on another circle; a second plate over said first plate and having holes therethrough substantially aligned on a radial line from the center of the second plate, the number of the second plate holes corresponding to the number of holes in any one of said sets of holes in said first plate; means for centering said second plate over said first plate and retaining both plates in rotative positions on said base; means for turning said second plate; means for turning said first plate; stop means for limiting the degree of turning of the first plate in one direction; the holes in said second plate being spaced on said radial line to center, one each, on said circles of travel of the holes in said first plate; a plurality of receptacles below said first plate, two in number for each circle of said first plate holes; and a plurality of members formed to pass through all of said holes.

2. A test machine comprising a base; a plate having a plurality of sets of holes therethrough and aligned therearound on circles of different radii which extend from the center of the plate, each set of holes having one hole on one circle and another hole on another circle; a second plate over said first plate and having holes therethrough substantially aligned on a radial line from the center of the second plate, the number of the second plate holes corresponding to the number of holes in any one of said sets of holes in said first plate; means for centering said second plate over said first plate and retaining both plates in rotative positions on said base; means for turning said second plate; means for turning said first plate; stop means for limiting the degree of turning of the first plate in one direction; the holes in said second plate being spaced on said radial line to center, one each, on said circles of travel of the holes in said first plate; a plurality of receptacles below said first plate, two in number for each circle of said first plate holes; and a plurality of members formed to pass through all of said holes; and a cover plate relatively fixed in position over said second plate having an opening therethrough under which said second plate holes may register; stop means limiting said second plate rotation to be between two positions, one of which is initially to have its holes in registry with the cover plate opening but out of registry with holes in the first plate, and the other position at the end of travel of the second plate holes to have completed registry with all the holes in one set of the first plate.

3. A test machine comprising a base; a plate having a plurality of sets of holes therethrough and aligned therearound on circles of different radii which extend from the center of the plate, each set of holes having one hole on one circle and another hole on another circle; a second plate over said first plate and having holes therethrough substantially aligned on a radial line from the center of the second plate, the number of the second plate holes corresponding to the number of holes in any one of said sets of holes in said first plate; means for centering said second plate over said first plate and retaining both plates in rotative positions on said base; means for turning said second plate; means for turning said first plate; stop means for limiting the degree of turning of the first plate in one direction; the holes in said second plate being spaced on said radial line to center, one each, on said circles of travel of the holes in said first plate; a plurality of receptacles below said first plate, two in number for each circle of said first plate holes; and a plurality of members formed to pass through all of said holes; and a cover plate relatively fixed in position over said second plate having an opening therethrough under which said second plate holes may register; stop means limiting said second plate rotation to be between two positions, one of which is initially to have its holes in registry with the cover plate opening but out of registry with holes in the first plate, and the other position at the end of travel of the second plate holes to have completed registry with all the holes in one set of the first plate; said first plate stop means positioning a set of holes therein for communication with said receptacles.

4. A test machine comprising a base; a plate having a plurality of sets of holes therethrough and aligned therearound on circles of different radii which extend from the center of the plate, each set of holes having one hole on one circle and another hole on another circle; a second plate over said first plate and having holes therethrough substantially aligned on a radial line from the center of the second plate, the number of the second plate holes corresponding to the number of holes in any one of said sets of holes in said first plate; means for centering said second plate over said first plate and retaining both plates in rotative positions on said base; means for turning said second plate; means for turning said first plate; stop means for limiting the degree of turning of the first plate in one direction; the holes in said second plate being spaced on said radial line to center, one each, on said circles of travel of the holes in said first plate; a plurality of receptacles below said first plate, two in number for each circle of said first plate holes; and a plurality of members formed to pass through all of said holes; and a cover plate relatively fixed in position over said second plate having an opening therethrough under which said second plate holes may register; stop means limiting said second plate rotation to be between two positions, one of which is initially to have its holes in registry with the cover plate opening but out of registry with holes in the first plate, and the other position at the end of travel of the second plate holes to have completed registry with all the holes in one set of the first plate; said first plate stop means positioning a set of holes therein for communication with said receptacles; said second plate turning means being formed to engage selectively with said first plate turning means.

5. A test machine for responding to a set of statements or questions comprising a plurality of response elements one carrying identification for each statement or question; a circular plate carrying sets of holes therethrough, one hole for each of several responses to each statement or question, the holes in each set being radially spaced apart and circumferentially spaced one from the other in predetermined accordance with right and wrong answers; a plurality of receptacles below said plate, two each for each hole of each of said sets, said receptacles receiving said response elements as they may pass through said holes; means permitting turning of said plate about a central axis in one direction and stopping turning in the opposite direction to position one of said sets of holes for dropping said elements to said receptacles; a second plate axially centered with and over said first plate to rotate thereover and having a series of holes therethrough each radially disposed one from the other to have one hole aligned on the circle of travel of each of the first plate holes thereunder; means limiting rotation of said second plate between a position of registry of its holes with holes in said first plate when the first plate is in its said stopped position and a position of non-registry therewith reached by turning in a direction opposite to that permitted of the first plate.

6. A test machine for responding to a set of statements or questions comprising a plurality of response elements one carrying identification for each statement or question; a circular plate carrying sets of holes therethrough, one hole for each of several responses to each statement or question, the holes in each set being radially spaced apart and circumferentially spaced one from the other in predetermined accordance with right and wrong answers; a plurality of receptacles below said plate, two each for each hole of each of said sets, said receptacles receiving said response elements as they may pass through said holes; means permitting turning of said plate about a central axis in one direction and stopping turning in the opposite direction to position one of said sets of holes for dropping said elements to said receptacles; a second plate axially centered with and over said first plate to rotate thereover and having a series of holes therethrough each radially disposed one from the other to have one hole aligned on the circle of travel of each of the first plate holes thereunder; means limiting rotation of said second plate between a position of registry of its holes with holes in said first plate when the first plate is in its said stopped position and a position of non-registry therewith reached by turning in a direction opposite to that permitted of the first plate; means for rotating said second plate between said two positions; and means interengaging said rotating means and said first plate to rotate simultaneously both plates in said direction permitted for the first plate to the said second plate position of non-registry.

7. A test machine for responding to a set of statements or questions comprising a plurality of response elements one carrying identification for each statement or question; a circular plate carrying sets of holes therethrough, one hole for each of several responses to each statement or question, the holes in each set being radially spaced apart and circumferentially spaced one from the other in predetermined accordance with right and wrong answers; a plurality of receptacles below said plate, two each for each hole of each of said sets, said receptacles receiving said response elements as they may pass through said holes; means permitting turning of said plate about a central axis in one direction and stopping turning in the opposite direction to position one of said sets of holes for dropping said elements to said receptacles; a second plate axially centered with and over said first plate to rotate thereover and having a series of holes therethrough each radially disposed one from the other to have one hole aligned on the circle of travel of each of the first plate holes thereunder; means limiting rotation of said second plate between a position of registry of its holes with holes in said first plate when the first plate is in its said stopped position and a position of non-registry therewith reached by turning in a direction opposite to that permitted of the first plate; means for rotating said second plate between said two positions; and means interengaging said rotating means and said first plate to rotate simultaneously both plates in said direction permitted for the first plate to the said second plate position of non-registry; and a cover plate over said second plate fixed against rotation therewith and having a window with which the holes of said second plate may register.

8. In a test response machine, a plurality of response members; a plurality of superimposed plates, one of which plates carries a plurality of spaced holes to receive therethrough said members and arranged for true and false positions; and a second one of said plates next above said one plate having a single set of holes therethrough arranged to register one at a time with a hole in said second plate upon shifting of said one plate thereover; and receptacle means receiving such of said response members as may pass through registered holes of both said one and second plates, said receptacle means being arranged to retain response members segregated as received through the respective holes in said one plate.

9. In a test response machine, a plurality of response members; a plurality of superimposed plates, one of which plates carries a plurality of spaced holes to receive therethrough said members and arranged for true and false positions; and a second one of said plates next above said one plate having a single set of holes therethrough arranged to register one at a time with a hole in said one plate upon shifting of said one plate thereover; and receptacle means receiving such of said response members as may pass through registered holes of both said one and another plates, said receptacle means being arranged to retain response members segregated as received from said hole different positions in said another plate; and a third of said superimposed plates fixed in position over said one plate and having opening means therethrough registering only with said one plate holes when in initial positions.

10. In a test response machine, a plurality of response members; a plurality of superimposed plates, one of which plates carries a plurality of spaced holes to receive therethrough said members and arranged for true and false positions; and a second one of said plates next above said one plate having a single set of holes therethrough arranged to register one at a time with a hole in said one plate upon shifting of said one plate thereover; and receptacle means receiving such of said response members as may pass through registered holes of both said one and another plates, said receptacle means being arranged to retain response members segregated as received from said hole different positions in said another plate; and a third of said superimposed plates fixed in position over said one plate and having opening means therethrough registering only with said one plate holes when in initial positions; means preventing shifting of said second plate in one direction while permitting shifting in the opposite direction; and means limiting shifting of said one plate to reciprocations between fixed points over the second plate.

11. In a test response machine, a plurality of response members; a plurality of superimposed plates, one of which plates carries a plurality of spaced holes to receive therethrough said members and arranged for true and false positions; and a second one of said plates next above said one plate having a single set of holes therethrough arranged to register one at a time with a hole in said one plate upon shifting of said one plate thereover; and receptacle means receiving such of said response members as may pass through registered holes of both said one and second plates, said receptacle means being arranged to retain response members segregated as received through the respective holes in said one plate; and a third of said superimposed plates fixed in position over said one plate and having opening means therethrough registering only with said one plate holes when in initial positions; means preventing shifting of said second plate in one direction while permitting shifting in the opposite direction; and means limiting shifting of said one plate to reciprocations between fixed points over the second plate; and means for shifting said one plate between said points across the second plate in the direction of non-travel thereof; and means for interengaging both said one and said second plates for common reverse travel.

AMOS B. CARLILE.